United States Patent [19]

Wilkinson et al.

[11] Patent Number: 4,886,282
[45] Date of Patent: Dec. 12, 1989

[54] HYDRANT REFUELER

[75] Inventors: Michael J. Wilkinson, Willow Grove; Robert G. Watkins, Jr., Coatsville; Edward A. Sell, Parkside, all of Pa.

[73] Assignee: General Transervice, Inc., Chester, Pa.

[21] Appl. No.: 261,561

[22] Filed: Oct. 24, 1988

[51] Int. Cl.⁴ .............................................. B60P 3/00
[52] U.S. Cl. ..................................... 280/4; 137/351; 141/231; 182/113; 182/132; 222/608
[58] Field of Search .................... 280/831, 4; 137/351; 141/231; 182/113, 132; 222/608; 169/24

[56] References Cited

U.S. PATENT DOCUMENTS

| | | | |
|---|---|---|---|
| 2,525,074 | 10/1950 | Knight | 137/351 X |
| 2,948,306 | 8/1960 | Kuraeff | 141/231 |
| 3,529,696 | 9/1970 | Jacobsen | 182/132 X |
| 3,641,738 | 2/1972 | Johnson | 182/132 |
| 3,648,720 | 3/1972 | Kornahrens | 137/351 |

OTHER PUBLICATIONS

Dart Refueler Chassis Specifications, Dart Truck Company, Kansas City, Mo. 64141.
Hose Reels, Clifford B. Hannay & Sons, Inc., Westerlo, N.Y. 12193, 1978.

*Primary Examiner*—John A. Pekar
*Attorney, Agent, or Firm*—Ratner & Prestia

[57] ABSTRACT

A hydrant refueler for aircraft is provided with a plurality of decks each at a different fixed height above ground to enable the refueler operator to connect to the fuel tanks of aircraft having wings at different heights above ground. The uppermost deck is provided with foldable side guard railings which when lowered will permit the refueler vehicle to clear the wing of a low wing aircraft and which when raised will provide necessary safety protection to a refueler operator as he services a high wing aircraft. A rigid cross bar guard is provided at at least one end of the foldable side guard railings.

7 Claims, 3 Drawing Sheets

4,886,282

HYDRANT REFUELER

FIELD OF THE INVENTION

This invention relates to equipment for refueling aircraft at airports, particularly major airports.

BACKGROUND OF THE INVENTION

Major airports are frequently constructed to have large-capacity underground supply systems for aircraft fuel. Access to the supply systems is by way of hydrants located below the airport surface but accessible from the surface of the airport. The hydrants are equipped with flow-control valves whose open and closed positions are controlled by pressurized air supplied to the valve by a pneumatic hose under the control of the operator of the refueler vehicle.

A refueler vehicle of the hydrant type is not equipped with a refueling tank. The essential elements of a hydrant refueler vehicle are: a fuel hydrant hose and means for coupling the fuel hydrant hose to the hydrant; a pressurized air hose controllable by the refueler operator from a remote position, such as at the fuel intake valve of the aircraft and means for coupling the pressurized-air hose to the hydrant valve; at least one, and preferably two or more, fuel delivery hoses and means for coupling the fuel delivery hoses to the intake valve(s) of the aircraft; means, usually including filtering means and metering means, inter-connecting the hydrant and delivery fuel hoses on the refueler vehicle; and at least one platform or deck for supporting the operator as he connects the fuel delivery hose(s) of the refueler vehicle to the intake or tank valve(s) of the aircraft usually located on the undersurface of one of the wings of the aircraft. No fuel pump is needed on a hydrant refueler vehicle. Pressure for causing the fuel to flow from the underground supply system into the tanks of the aircraft is provided by the underground supply facilities at the airport.

To accommodate for different models of aircraft having wings at different heights above ground, it is customary for the refueler vehicles, whether of the hydrant type or of the tank type, to be equipped with an elevator platform on which the operator stands when he makes the connection of the delivery fuel hose(s) to the tank valve(s) on the underside of the aircraft wing and also during subsequent delivery of the fuel into the aircraft tank(s). Such elevator platform may, for example, be of the scissors type. However, an elevator platform, whether of the scissors or other type, has the undesirable feature of tending to become jammed or otherwise disabled, particularly in sub-freezing weather when ice collects on the equipment. When this occurs, take-off of the plane may be delayed. This concludes a brief discussion of the background of the present invention.

Pertinent prior patent art of which we are aware is U.S. Pat. No. 2,525,074, issued Oct. 10, 1950, to J. E. Knight. This patent shows an elevatable platform.

Pertinent prior publication art is a publication of General Transervice Inc., a subsidiary of Watkins Systems to which the present invention is assigned. This publication shows a fixed platform, foldable guard railings and loose cross-guard chains.

Pertinent physical prior art is a Rampmaster Modular Refueler for which General Transervice Inc. is exclusive distributor. This vehicle had a two-level fixed deck, fold down guard railings, and loose chain cross-guards.

SUMMARY OF THE INVENTION

An object of the present invention is to provide an improved construction which eliminates the need for an elevator-type platform on refueler vehicles.

The foregoing object is achieved, in accordance with the present invention, by providing platform means of a non-elevating type which nevertheless enables the refueling operator to reach and make connection to the fuel intake valve on the underside of the wing of an aircraft irrespective of the height of the fuel intake valve above ground provided, of course, that its height is within commercial and expected limits.

Air carriers today usually have fleets of craft of various makes, models and design. However, the distance between ground and the fuel intake valve on the underside of the wing of the craft is known for each model of craft.

We have found that we can accommodate for the difference in wing height for each type of aircraft by a plurality of fixed platforms or decks at different levels on the hydrant refueling vehicle. Preferably, three decks may be provided: an upper deck, a lower deck, and an intermediate or center deck positioned at a level between that of the upper and lower decks. Government regulations require that each platform or deck be provided with a safety guard railing, and that the guard railing have a minimum height (42 inches) above the platform floor.

We have determined that to accommodate to aircraft having a wing at maximum height, the upper deck on a hydrant refueler must be so far above the airport surface that its safety railing, if 42" high, would not clear the wing of an aircraft having a minimum wing.

To solve the foregoing problem, the upper deck, in accordance with the present invention, is provided with a pair of opposed fold-down guard railings which may be raised pivotally to an elevated position when the hydrant refueler truck is driven under the wing of an aircraft having a maximum-height wing but which are kept in a lower fold-down position when the vehicle is driven under the wing of a low-wing aircraft.

In accordance with a presently preferred form of the invention, a guard cross bar is provided for the fold-down railings. The guard cross bar extends laterally between one end of each of the opposed foldable guard railings when the railings are in their raised positions. At this end, a cylindrical collar is rotatably mounted on the guard railing in such manner as to be pivotable about an axis transverse to the axis of the collar. Each collar receives an opposite end of the guard cross bar. To raise the foldable guard railings, a hinge in unlocked by the operator and one guard railing is then swung pivotally upwardly through an arc. When this occurs, the guard cross bar swings upwardly in an opposing arc and the collar pivots on its pivot pin so that the axis of the collar follows the axis of the guard cross bar, i.e., the axis of the collar maintains its alignment with the axis of the cross bar. Further details are given in the Detailed Description.

DETAILED DESCRIPTION

Figure 1:
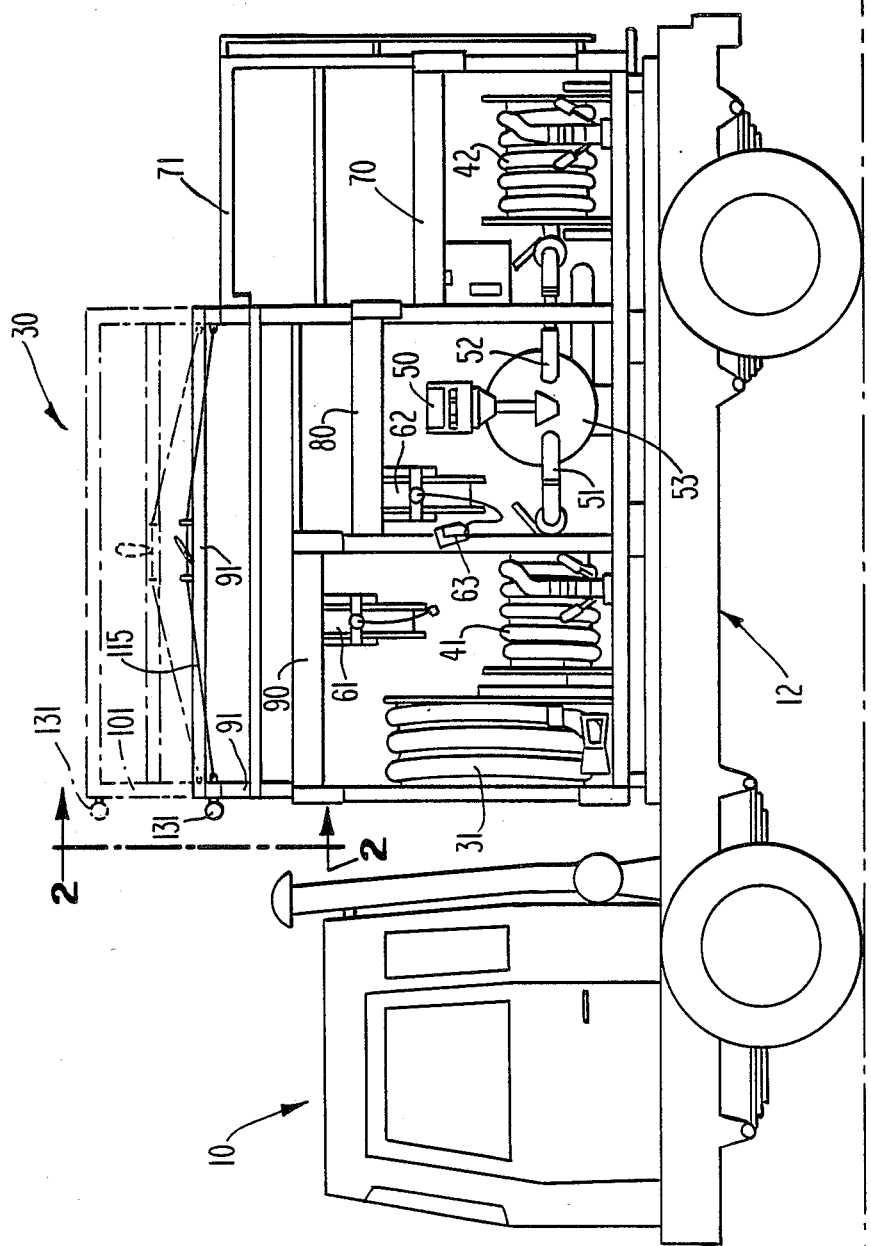
FIG. 1 is a side elevational view of a hydrant refueler vehicle embodying the improvements of the present invention.

FIG. 1 illustrates a hydrant refueler which embodies the present invention. As there shown, the refueler comprises a motorized truck 10 having a channel rail frame 12 on which is supported a modular hydrant refueler unit 30. The refueler unit 30 includes a power-driven drum or reel of hydrant fuel hose 31, typically a 4" I.D. hose, sometimes referred to as pit hose. This hose has at one end a coupling adapted to be connected to a fuel hydrant (not shown) at the airport. Such hydrants are usually located in a pit having an access cover. The hydrants are connected to a pressurized supply of aircraft fuel contained in the underground fuel supply system at the airport.

The refueler unit 30 also includes one or more fuel delivery hoses 41,42 having couplings adapted to be connected to one or more fuel intake valves in the wing of an aircraft. Such intake valves, which connect with the fuel tanks of the aircraft, are usually located in the undersurface of the aircraft wing. In FIG. 1, two reels of fuel delivery hoses 41,42 are visible. The discharge end of the hydrant fuel hose 31 is connected through a filtering vessel (not visible) to a distribution valve 53 having a metering device 50. Valve 53 has two outlets 51,52 connected respectively to fuel delivery hoses 41,42. Thus, fuel may be delivered to the aircraft through both delivery hoses 41 and 42 simultaneously.

The refueler unit 30 also includes two reels of pneumatic hose 61,62. One end of the first pneumatic hose 61 is adapted to be coupled to an air-pressure-responsive valve at the fuel hydrant. In the absence of air-pressure, this valve is OFF by virtue of a spring or other biasing means. The other end of the first pneumatic hose 61 and one end of the second pneumatic hose 62 are coupled to a source of pressurized air on the refueler unit 30. The other end of the second pneumatic hose 62 is equipped with a lever or handle 63 spring-loaded toward the OFF position and adapted to be operated by the refueler operator. When the refueler operator connects the fuel delivery hoses 41,42 to the fuel intake valves in the wing of an aircraft, he carries with him to that site the control or handle end 63 of pneumatic hose 62. Thus, the refueler operator is able to control the flow of fuel from the pressurized underground fuel supply system to the aircraft by operating handle 63 of the pneumatic hose. This handle 63 is a so-called "dead man's" control since it shuts off automatically when the manual pressure of the operator's hand is released.

To enable the refueler operator to connect the fuel delivery hoses 41,42 to the intake valves of the aircraft, the hydrant refueler 30 of the present invention, instead of being provided with an adjustable elevator-type of platform, as had been customary, is provided with a plurality of fixed decks or platforms, each at a different preselected fixed height above ground. In a presently preferred form of hydrant refueler three fixed decks are provided, a lower deck 70, a center deck 80 and an upper deck 90. Lower deck 70 is at a height of 82 inches above ground. Center deck 80 is at a height of 94 inches above ground and upper deck 90 is at a height of 106 inches above ground.

Government safety regulations require that the operator platform be provided with safety or guard side railings having a minimum height of 42 inches above the floor of the platform. Accordingly, in the modular refueler unit 30, lower fixed deck 70 is provided with a pair of fixed side guard railings 71 at a height of 42 inches above the floor of the deck 70. These guard railings 71 are 124 inches above ground. This is low enough to enable the hydrant refueler vehicle to pass under the wing of a low wing aircraft.

However, if center deck 80 and upper deck 90 were to be provided with side guard railings 42 inches above the platform floors, the railings would be too high to clear the wing of a low wing aircraft.

Accordingly, in accordance with the present invention, center and upper decks 80 and 90 are provided with a pair of opposed fixed side guard railings 91,92 (FIGS. 2,3) whose height above ground is 124 inches. This height is substantially the same as that of the guard railings 71 of lower deck 70. Thus, fixed guard railings 91, 92, like fixed guard railings 71, will pass under the wing of a low wing aircraft. However, guard railings 91,92 are only 30 inches above the floor of center deck 80 and only 18 inches above the floor of upper deck 90. Hence, guard railings 91,92 do not meet Government safety requirements.

Figure 2:
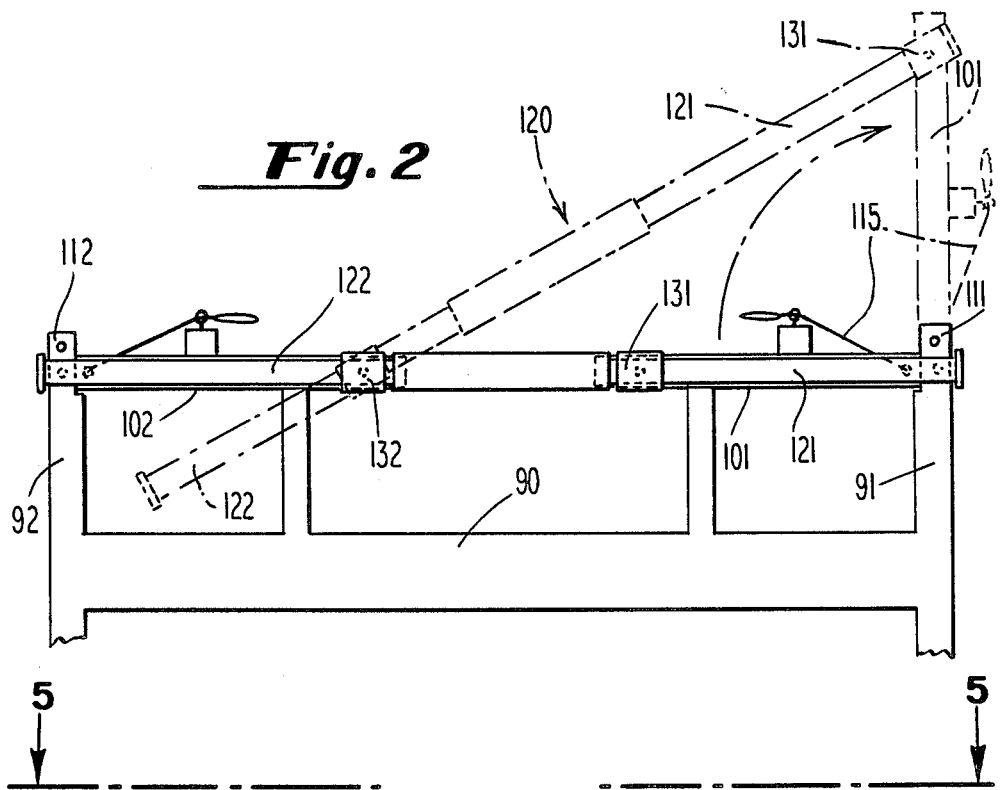
FIG. 2 is an end view looking along the line 2—2 of FIG. 1 in the direction of the arrows illustrating how a railing is raised.
Figure 3:
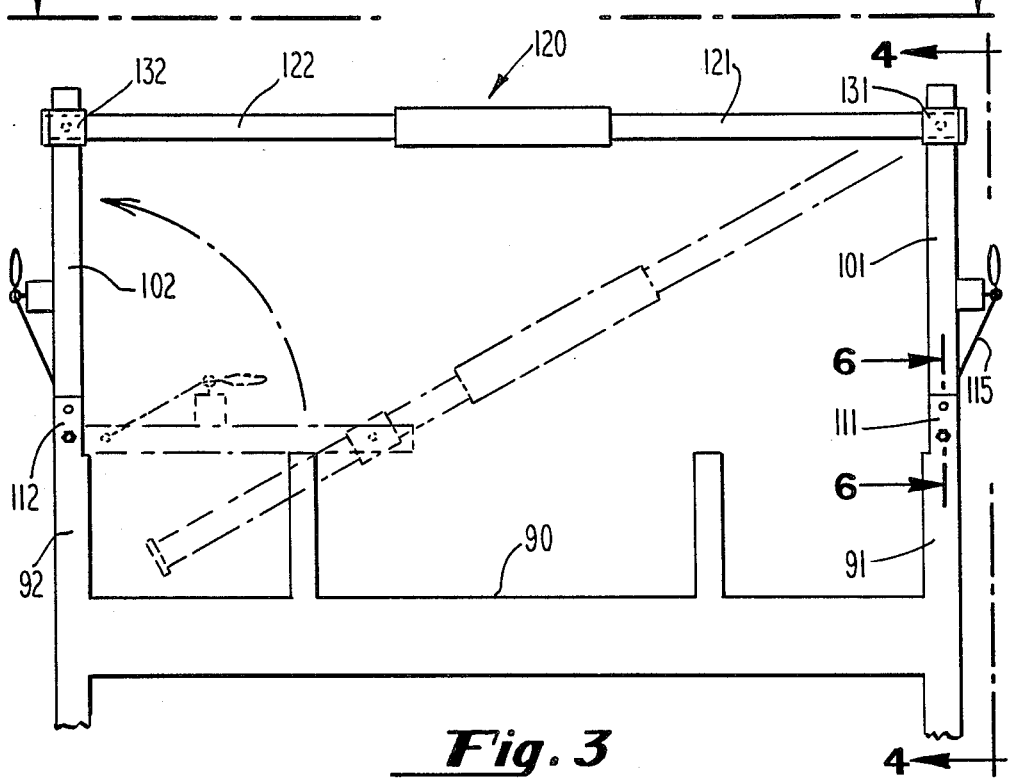
FIG. 3 is an end view generally similar to FIG. 2 but showing both railings in raised position.

To meet Government safety requirements, the fixed side guard railings 91,92 are provided with opposed foldable side guard railings 101,102, one on each side, as seen in FIGS. 2 and 3. These guard railings 101,102 have a height of 24 inches and are secured to the tops of railings 91,92, as by hinges 111, 112. When the hydrant refueler is to service a high wing aircraft the foldable guard railings 101,102 are raised pivotally to their upper positions, as illustrated in phantom in FIG. 1, and as shown in FIG. 3. The upper surface of the foldable railings 101,102 is then 42 inches above the floor of the upper deck 90, 54 inches above the floor of the center deck 80 and 148 inches above ground. From the upper deck 90, the refueler operator is able to easily connect the delivery hoses 41, 42 to the intake valves at the underside of the wing of a high wing aircraft and the raised side guard railings 101,102 provide him with the safety which is required.

In accordance with the present invention, and as seen in FIG. 3, a rigid guard cross bar 120 is provided across at least one end of the foldable side guard railings 101,102.

Figure 6:
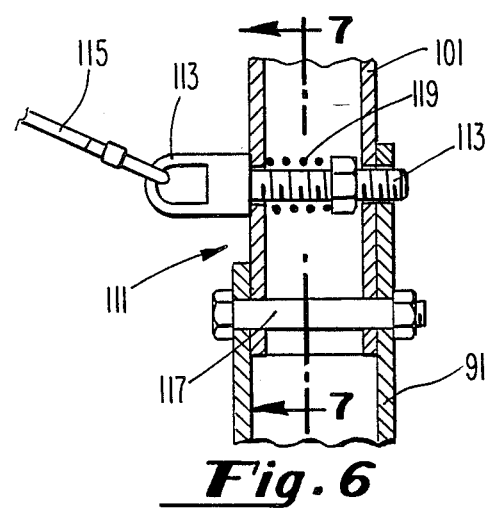
FIG. 6 is a detail of the hinge lock looking along the line 6—6 of FIG. 3.

Referring now to FIGS. 2–7, the foldable side guard railings 101,102 are secured pivotally as on hinge pins 117, to the upper ends of the fixed side railings 91,92 by hinges 111,112. The hinges are provided with lock pins 113 which are loaded by springs 119 in the locking direction. The spring-biased lock pins 113, one of which is shown in detail in FIG. 6, are released by the operator by means of a pull cord 115.

Secured pivotally to each of the foldable guard railings 101,102 near to their outer or upper end, is a tubular member or collar identified 131,132. Extending across the refueler vehicle and having a length at least equal to the distance between side guard rail 91 and side guard rail 92 is the previously referred to cross bar 120. Opposite ends 121,122 of cross bar 120 are received within the axial bore of pivotal collars 131,132.

Figure 7:
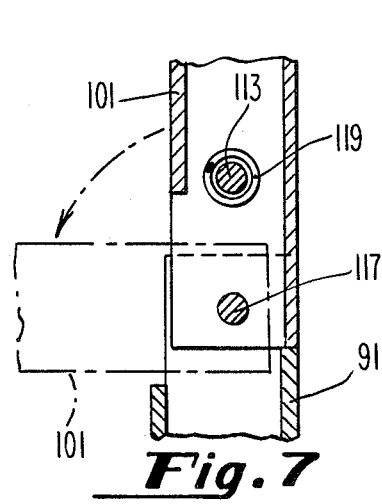
FIG. 7 is a view looking along the line 7—7 of FIG. 6.

To raise the foldable side guard railings 101,102 from their fold-down positions shown in solid line in FIG. 2 to their fully raised positions shown in solid line in FIG. 3, the operator pulls one of the railings for example, railing 101, upwardly in a pivotal fashion, the railing pivoting on pins 117 (FIGS. 6, 7). During this movement, railing 101 carries with it collar 131 and cross bar 120. Collar 131 slides along end 121 of the cross bar and pivots on its pivotal mounting. The center axis of the collar is maintained in alignment with the center axis of the cross bar. The operator then raises the other railing 102 as illustrated in FIG. 3. The action is similar to that just described for railing 101. Collar 132 pivots as it slides along end 122 of the cross bar 120 to maintain its center axis in alignment with that of the cross bar. When the cross bar guard is in its fully raised position, as illustrated in FIG. 3, the foldable side guard railings 101,102 are locked in position as by a spring-loaded lock pin, one of which pin 113 is seen in FIG. 6.

Figure 4:
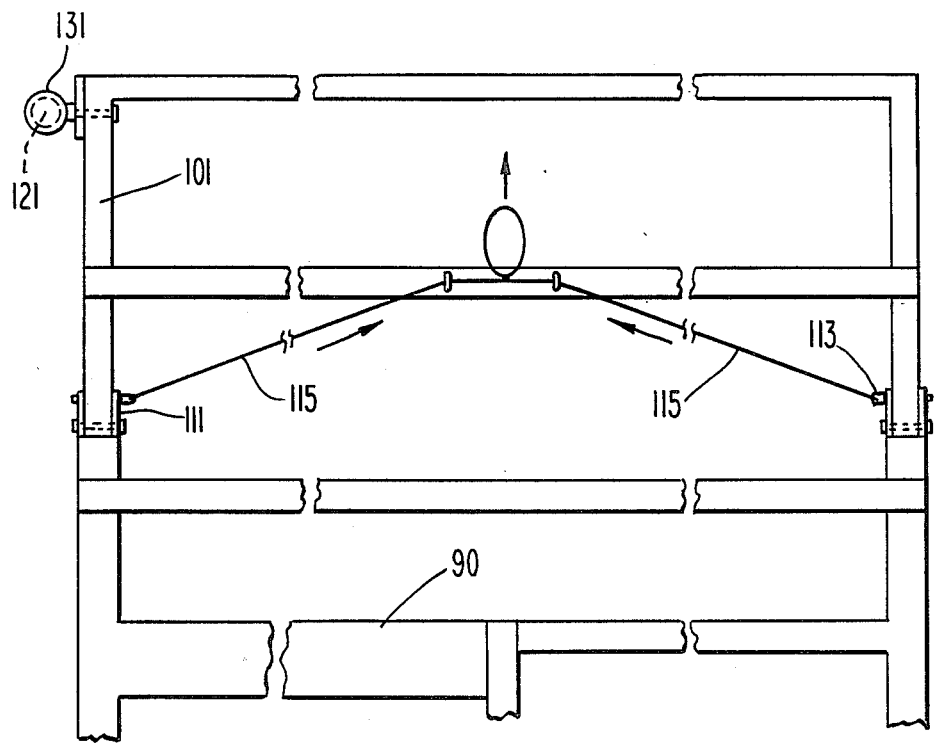
FIG. 4 is a side view looking along the line 4—4 of FIG. 3 in the direction of the arrows.
Figure 5:
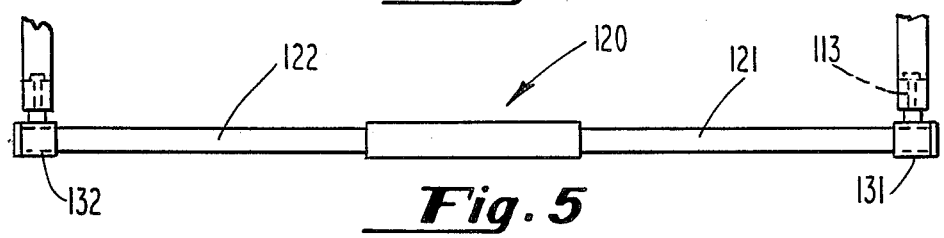
FIG. 5 is a top view looking down along the line 5—5 of FIG. 3.

To lower the foldable side guard railings 101,102, the operator first pulls on release cord 115 (FIG. 4). This pulls the lock pins from their locked position and allows the side railings to move pivotally downwardly. One of the side railings, for example 101, is lowered first and then the other. During the lowering of side railing 101, end 121 of cross bar 120 drops downwardly through an arcuate path and collar 131 pivots on its mounting as it slides along the cross bar. The other railing 102 is then lowered to bring the cross bar to the position shown in solid line in FIG. 2.

I claim:

1. A hydrant refueler for aircraft comprising:
   a. a delivery fuel hose having at one end coupling means for coupling to a fuel intake valve of an aircraft;
   b. a plurality of decks fixedly supported at different levels on said hydrant refueler for supporting a refueling operator, each deck being at a level adapted to facilitate coupling by the operator to a fuel intake valve of an aircraft, thereby to give the hydrant refueler the capability of refueling different aircraft having wings at different heights;
   c. a first pair of fixed side guard railings for a lower level deck, said first railings having a fixed height;
   d. a second pair of fixed side guard railings for an upper level deck,
   e. a pair of foldable side guard railings, one each mounted pivotally on each of said second pair of fixed side guard railings, said foldable railings adapted to be raised to a height above that of said second fixed side guard railings to provide safety for an operator working on said upper level deck;
   f. a rigid cross bar guard and means for connecting opposite ends of said cross bar guard pivotally to each of said pair of foldable side guard railings at an upper end thereof.

2. A hydrant refueler according to claim 1 wherein said cross bar connecting means comprise a pair of collars, one each pivotally connected to an upper end of each of said foldable side guard railings for receiving opposite ends of said rigid cross bar guard.

3. Apparatus according to claim 2 wherein locking means are provided for locking said foldable side guard railings in raised position.

4. A mobile hydrant refueler comprising a motorized flatbed body and a modular hydrant refueler unit supported on said body, said hydrant refueler unit comprising:
   a. a fuel hose having at one end coupling means for coupling to a hydrant at an airport, said hydrant being connected to a pressurized underground fuel supply and having an air-pressure-responsive valve for controlling the flow of fuel from said hydrant,
   b. at least one delivery fuel hose having at one end coupling means for coupling to a fuel intake valve of an aircraft;
   c. a pneumatic hose and means for supplying pressurized air to said hose;
   d. connecting means at one end of said hose for supplying pressurized air to said air-pressure-responsive valve at said hydrant, said pneumatic hose having at its other end a manually-operable spring-loaded lever for controlling the flow of pressurized air to said hydrant valve, said lever being biased to an OFF position in the absence of manual actuation;
   e. means, including filtering and metering means, connecting the other end of said hydrant fuel hose to the other end of said delivery fuel hose;
   f. a plurality of at least three decks fixed respectively at lower, intermediate and upper levels for supporting a refueling operator, each deck adapted to facilitate connection by the operator of the delivery-fuel-hose coupling means to the fuel intake valve in the wing of an aircraft, thereby to render the hydrant refueler capable of refueling different aircraft having wings at different heights above ground;
   g. a first pair of fixed side guard railings for said lower level platform, said first railings having a fixed height;
   h. a second pair of fixed side guard railings for said intermediate and upper level platforms, said second railings having a fixed height equal substantially to the fixed height of said first railings;
   i. a pair of foldable side guard railings, one each mounted on each of said second fixed side guard railings, said foldable side guard railings adapted to be raised pivotally to a height above that of said fixed side guard railings to provide safety for an operator working on said upper level platform; and
   j. rigid cross bar guard means connecting said pair of foldable side guard railings at at least one end thereof.

5. A mobile hydrant refueler according to claim 4 wherein said cross bar guard means includes a rigid cross bar and means for connecting opposite ends of said cross bar pivotally to each of said pair of foldable side guard railings.

6. Apparatus according to claim 5 wherein said pivotal connecting means includes a pair of collars, one each pivotally connected to an upper end of each of said foldable side guard railings for receiving opposite ends of said rigid cross bar.

7. Apparatus according to claim 6 wherein locking means are provided for locking said foldable side guard railings in raised position.

* * * * *